United States Patent
Hong et al.

(10) Patent No.: US 9,401,505 B2
(45) Date of Patent: Jul. 26, 2016

(54) SEPARATOR INCLUDING COATING LAYER OF INORGANIC AND ORGANIC MIXTURE, AND BATTERY INCLUDING THE SAME

(71) Applicants: Ki Chul Hong, Uiwang-si (KR); Myung Kook Park, Uiwang-si (KR); Jae Goo Doh, Uiwang-si (KR); Jun Ho Chung, Uiwang-si (KR); Geon Ja Lim, Uiwang-si (KR)

(72) Inventors: Ki Chul Hong, Uiwang-si (KR); Myung Kook Park, Uiwang-si (KR); Jae Goo Doh, Uiwang-si (KR); Jun Ho Chung, Uiwang-si (KR); Geon Ja Lim, Uiwang-si (KR)

(73) Assignee: CHEIL INDUSTRIES, INC., Gumi-si, Gyeongsangbuk-do (KR)

(*) Notice: Subject to any disclaimer, the term of this patent is extended or adjusted under 35 U.S.C. 154(b) by 204 days.

(21) Appl. No.: 13/778,376

(22) Filed: Feb. 27, 2013

(65) Prior Publication Data
US 2013/0224555 A1    Aug. 29, 2013

(30) Foreign Application Priority Data

Feb. 29, 2012    (KR) .................. 10-2012-0021220

(51) Int. Cl.
*H01M 2/16* (2006.01)
*H01M 2/14* (2006.01)

(52) U.S. Cl.
CPC ............. *H01M 2/166* (2013.01); *H01M 2/14* (2013.01); *H01M 2/16* (2013.01)

(58) Field of Classification Search
CPC .......... H01M 2/14; H01M 2/16; H01M 2/166
USPC ........................................... 429/144
See application file for complete search history.

(56) References Cited

U.S. PATENT DOCUMENTS

| | | | |
|---|---|---|---|
| 7,662,517 B2 | 2/2010 | Lee et al. | |
| 2003/0157408 A1* | 8/2003 | Sun | 429/249 |
| 2007/0082261 A1* | 4/2007 | Lee | 429/144 |
| 2008/0102361 A1 | 5/2008 | Lee et al. | |
| 2008/0190841 A1 | 8/2008 | Pascaly et al. | |
| 2011/0293976 A1* | 12/2011 | Chiba et al. | 429/94 |
| 2013/0054061 A1* | 2/2013 | Nishimoto | 701/22 |
| 2014/0170482 A1* | 6/2014 | Park et al. | 429/211 |

FOREIGN PATENT DOCUMENTS

| | | |
|---|---|---|
| EP | 1 955 756 A1 | 8/2008 |
| EP | 2 133 387 A1 | 12/2009 |
| EP | 2133387 A1 * | 12/2009 |
| KR | 10-2006-0072065 A | 6/2006 |
| KR | 10-2009-0122395 A | 11/2009 |

OTHER PUBLICATIONS http://accuratus.com/alumox.html, 2013 Accuratus, Sep. 28, 2014.*
Korean Office Action dated Jun. 20, 2014.
Chinese Office Action dated Nov. 4, 2014.

* cited by examiner

*Primary Examiner* — Jonathan Jelsma
*Assistant Examiner* — Rashid Alam
(74) *Attorney, Agent, or Firm* — Lee & Morse, P.C.

(57) ABSTRACT

A polyolefin porous separator includes a polyolefin porous base film, and a coating layer formed on one or both sides of the base film. The coating layer includes inorganic particles. The inorganic particles include first inorganic particles having an average particle size ranging from 150 nm to 600 nm, and second inorganic particles having an average particle size ranging from 5 nm to 90 nm. The separator has a thermal conductivity of 0.3 W/m·K or more.

19 Claims, 1 Drawing Sheet

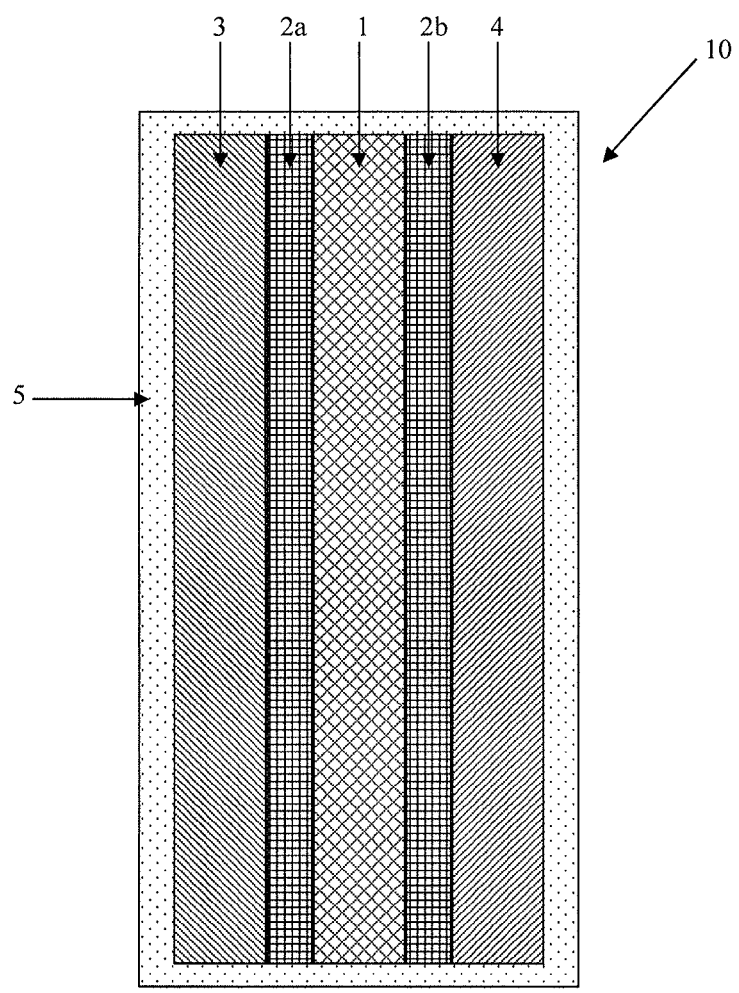

SEPARATOR INCLUDING COATING LAYER OF INORGANIC AND ORGANIC MIXTURE, AND BATTERY INCLUDING THE SAME

CROSS-REFERENCE TO RELATED APPLICATION

Korean Patent Application No. 10-2012-0021220, filed on Feb. 29, 2012, in the Korean Intellectual Property Office, and entitled: "SEPARATOR INCLUDING COATING LAYER OF INORGANIC AND ORGANIC MIXTURE, AND BATTERY INCLUDING THE SAME," is incorporated by reference herein in its entirety.

BACKGROUND

1. Field

Embodiments relate to a separator including a coating layer, and a battery including the same.

2. Description of the Related Art

A separator for an electrochemical battery refers to a middle layer disposed inside a battery to isolate a positive electrode and a negative electrode from each other while maintaining ionic conductivity to permit charge and discharge of the battery. The separator acts as a safety device for preventing the battery from overheating.

Technical development of and increasing demand for mobile devices have rapidly increased demand for rechargeable batteries as an energy source. In particular, many studies have focused on developing a lithium rechargeable battery having high energy density and discharge voltage, and the commercialization and broad use of various lithium rechargeable batteries have been realized to some degree.

Meanwhile, with increasing attention given to environment issues, various studies have been made to develop electric cars and hybrid cars for replacement of fossil fuel-based cars such as gasoline cars and diesel cars, which are regarded as one major cause of air pollution. Many studies have been conducted relating to the use of a lithium rechargeable battery as a power source for such electric cars, hybrid cars, and the like, and commercialization and use thereof have also been realized to some degree.

SUMMARY

Embodiments are directed to a porous separator including a polyolefin porous base film, and a coating layer formed on one or both sides of the base film. The coating layer includes inorganic particles, the inorganic particles including first inorganic particles having an average particle size ranging from about 150 nm to about 600 nm, and second inorganic particles having an average particle size ranging from about 5 nm to about 90 nm. The separator has a thermal conductivity of 0.3 W/m·K or more.

The coating layer may include about 70 wt % to about 90 wt % of the inorganic particles, and about 10 wt % to about 30 wt % of a binder polymer.

The binder polymer may include a polyvinylidene fluoride homopolymer, and a polyvinylidene fluoride-hexafluoropropylene copolymer.

The polyvinylidene fluoride homopolymer may have a weight average molecular weight of about 1,000,000 g/mol or more. The polyvinylidene fluoride-hexafluoropropylene copolymer may have a weight average molecular weight of about 800,000 g/mol or less.

The first inorganic particles and the second inorganic particles may be mixed in a weight ratio from about 99.9:0.1 to about 70:30.

The first inorganic particles and the second inorganic particles may be mixed in a weight ratio from about 99:1 to about 93:7.

An average particle size of the first inorganic particles may be about 500 nm. An average particle size of the second inorganic particles may be about 20 nm. The first inorganic particles and the second inorganic particles may be mixed in a weight ratio from about 95:5 to about 99:1.

An average particle size of the first inorganic particles may be about 500 nm. An average particle size of the second inorganic particles may be about 50 nm. The first inorganic particles and the second inorganic particles may be mixed in a weight ratio from about 95:5 to about 97:3.

An average particle size of the first inorganic particles may be about 500 nm. An average particle size of the second inorganic particles may be about 70 nm. The first inorganic particles and the second inorganic particles may be mixed in a weight ratio more than 91:9 to 97:3.

The inorganic particles may include alumina ($Al_2O_3$) particles.

The polyolefin porous base film may be selected from the group of a polyethylene monolayer film, a polypropylene monolayer film, a polyethylene/polypropylene bilayer film, a polypropylene/polyethylene/polypropylene triple-layer film, and a polyethylene/polypropylene/polyethylene triple-layer film.

The separator may have a coating composition loading amount of about 5 $g/m^2$ to about 10 $g/m^2$. The coating layer may have a thickness of about 1 μm to about 7 μm.

The separator may have a thermal shrinkage of 15% or less.

Embodiments are also directed to a battery stack including a positive electrode, a negative electrode, and a separator between the positive electrode and the negative electrode. The separator includes a polyolefin porous base film, and a coating layer formed on one or both sides of the base film. The coating layer includes inorganic particles, the inorganic particles including first inorganic particles having an average particle size ranging from about 150 nm to about 600 nm, and second inorganic particles having an average particle size ranging from about 5 nm to about 90 nm. The separator has a thermal conductivity of 0.3 W/m·K or more.

An adhesive strength between the coating layer and one or both of the positive electrode and the negative electrode may be 10 $gf/cm^2$ or more.

The battery stack may be an electrode assembly of a lithium ion rechargeable battery.

The positive electrode may be selected from the group of lithium cobalt oxide, lithium nickel cobalt manganese oxide, lithium manganese oxide, lithium iron phosphate and lithium nickel oxide electrodes. The negative electrode may be a crystalline or amorphous carbon electrode.

Embodiments are also directed to an electrochemical battery including a positive electrode, a negative electrode, a separator between the positive electrode and the negative electrode, and an electrolyte. The separator includes a polyolefin porous base film, and a coating layer formed on one or both sides of the base film. The coating layer includes inorganic particles, the inorganic particles including first inorganic particles having an average particle size ranging from about 150 nm to about 600 nm, and second inorganic particles having an average particle size ranging from about 5 nm to about 90 nm. The separator has a thermal conductivity of 0.3 W/m·K or more.

The positive electrode may be selected from the group of lithium cobalt oxide, lithium nickel cobalt manganese oxide, lithium manganese oxide, lithium iron phosphate and lithium nickel oxide electrodes. The negative electrode may be a crystalline or amorphous carbon electrode The electrochemical battery may be a lithium rechargeable battery.

BRIEF DESCRIPTION OF THE DRAWING

Features will become apparent to those of skill in the art by describing in detail exemplary embodiments with reference to the attached drawing in which:

FIG. 1 illustrates an electrochemical battery according to an embodiment.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art. In the drawing FIGURE, the dimensions of layers and regions may be exaggerated for clarity of illustration. It will also be understood that when a layer or element is referred to as being "on" another layer or substrate, it can be directly on the other layer or substrate, or intervening layers may also be present.

Embodiments may provide a porous separator including a polyolefin porous base film, and a coating layer formed on one or both sides of the base film, wherein the coating layer includes inorganic particles, and the inorganic particles include first inorganic particles having an average particle size ranging from 150 nm to 600 nm, and second inorganic particles having an average particle size ranging from about 5 nm to about 90 nm, and the separator has a thermal conductivity of 0.3 W/m·K or more.

The inorganic particles may be independently selected from different types of inorganic particles having different average particle sizes or diameters, in which smaller inorganic particles (second inorganic particles) may be selected from inorganic particles having an average particle size ranging from about 5 nm to about 90 nm, for example, an average particle size ranging from 20 nm to 70 nm, and larger inorganic particles (first inorganic particles) may be selected from inorganic particles having an average particle size ranging from about 150 nm to about 600 nm, for example from about 400 nm to about 600 nm, or more particularly, about 500 nm.

Within this size range, the inorganic particles may prevent or reduce the likelihood of deterioration in coating processability and dispersion within a coating solution, deterioration in mechanical properties, and an increase in electric resistance by allowing suitable adjustment of the coating layer. Further, pores of a suitable size may be created in the coating layer, thereby lowering the likelihood of internal short circuit upon charge and discharge of the battery.

According to experiments disclosed herein, when alumina particles having an average particle size of 500 nm are used alone as the inorganic particles, the separator has a thermal conductivity of 0.26 W/m·K, and when alumina particles having an average particle size of 100 nm are used alone as the inorganic particles, the separator has a thermal conductivity of 0.27 W/m·K. On the other hand, when the separator includes a coating layer containing inorganic particles having different average particle sizes, the separator may have a good thermal conductivity of 0.3 W/m·K or more.

The mixing ratio of the inorganic particles (e.g., alumina) having different inorganic particle sizes for providing the maximum heat conductivity differs according to the average particle sizes of the inorganic particles. For example, when larger inorganic particles have an average particle size of about 500 nm, the amount of smaller inorganic particles in the mixture of inorganic organic particles having different average particle sizes increases with increasing average particle size of the smaller inorganic particles, as selected within the range of about 20 nm to about 90 nm, in order to provide maximum heat conductivity.

For optimal mixing of the inorganic particles, when first inorganic particles having an average particle size of about 500 nm and second inorganic particles having an average particle size of about 20 nm are used, the first inorganic particles and the second inorganic particles may be mixed in a ratio (by weight) from about 95:5 to about 99:1, for example, in a ratio of about 97:3. When first inorganic particles having an average particle size of about 500 nm and second inorganic particles having an average particle size of about 50 nm are used, the first inorganic particles and the second inorganic particles may be mixed in a ratio from about 95:5 to about 97:3, for example in a ratio of about 95:5. When first inorganic particles having an average particle size of about 500 nm and second inorganic particles having an average particle size of about 70 nm are used, the first inorganic particles and the second inorganic particles may be mixed in a ratio or more than 91:9 to about 97:3, for example, in a ratio of about 93:7.

According to an implementation, the binder polymer may include: a) a polyvinylidene fluoride homopolymer having a weight average molecular weight of about 1,000,000 g/mol or more; and b) a polyvinylidene fluoride-hexafluoropropylene copolymer having a weight average molecular weight of about 800,000 g/mol or less.

As an example, the coating agent may contain: a) about 70 to about 90 wt % of the inorganic particles; and b) about 10 to about 30 wt % of the binder polymer.

Within this range, the inorganic particles may provide thermal stability, that is, heat resistance and heat dissipation, the organic binder may provide sufficient improvement of adhesion, and the coating layer may be formed in a relatively flat shape by preventing or reducing the likelihood of deterioration in coating processability and dispersion of the coating agent.

Specifically, within this content range, the organic binder may prevent or reduce the likelihood of excessive reduction in amount of the inorganic particles while sufficiently improving adhesion of the coating layer, thereby providing suitable heat dissipation and heat resistance.

According to an implementation, the polyvinylidene fluoride homopolymer may have a weight average molecular weight of about 1,000,000 g/mol or more. Polyvinylidene fluoride homopolymer may be dissolved in a low boiling point solvent, such as acetone. Accordingly, it is desirable that the polyvinylidene fluoride homopolymer be dissolved in a solvent such as DMF in practical use. When the remaining amount of the solvent is lowered to a predetermined range or less, for example, to 100 ppm or less, in a finally dried coating layer, it may be possible to prevent or reduce the likelihood of deterioration in adhesion of the coating layer due to excess remaining solvent.

A solvent, such as DMF and the like, that has a relatively high boiling point may be difficult to sufficiently dry after coating. However, it may be possible to prevent an excess of the solvent from remaining on the surface of the separator through suitable adjustment of drying conditions.

In addition, when the inorganic particles are present within the aforementioned range in the coating layer, it may be possible to achieve efficient suppression of thermal shrinkage of the separator through sufficient heat dissipation while securing the organic binder in a desired amount or more to achieve strong adhesion.

The coating agent of the organic and inorganic mixture may contain the polyvinylidene fluoride homopolymer and the polyvinylidene fluoride-hexafluoropropylene copolymer as organic binder polymer resins, and the inorganic particles. The coating agent may further contain a suitable solvent and other additives.

In preparation of the coating agent used herein, the polyvinylidene fluoride homopolymer, the polyvinylidene fluoride-hexafluoropropylene copolymer, and the inorganic particles may be dissolved or dispersed in suitable solvents, respectively, and mixed with each other.

For example, the polyvinylidene fluoride homopolymer may be prepared as a polymer solution by dissolving or dispersing the polyvinylidene fluoride homopolymer in dimethylformamide (DMF). The polyvinylidene fluoride-hexafluoropropylene copolymer may be prepared as a polymer solution by dissolving or dispersing the polyvinylidene fluoride-hexafluoropropylene copolymer in acetone. The inorganic particles may be prepared as an inorganic dispersion by dissolving or dispersing the inorganic particles in acetone.

The polymer solutions and the inorganic dispersion may be mixed in a suitable solvent to prepare a coating agent.

Examples of solvents used herein may include ketones, such as acetone, or alcohols, such as methanol, ethanol, isopropyl alcohol, or the like. These solvents may provide an advantage of allowing easy removal upon drying after coating.

According to an implementation, the coating agent may be prepared in the form of a mixture by sufficiently stirring the polymer solutions, the inorganic dispersion and the solvent using a ball mill, a bead mill or a screw mixer.

The separator including the coating layer may be prepared by coating the coating agent on one or both sides of a polyolefin base film, followed by drying the coating agent.

Any suitable coating method may be used to coat the coating agent on the polyolefin base film. For example, dip coating, die coating, roll coating, or comma coating may be used. These coating processes may be used alone or in combination thereof. For example, the coating layer of the separator may be formed by dip coating.

The coating layer formed on the separator may be subjected to drying. Here, any suitable drying process may be used.

Drying of the coating layer may be performed by, for example, hot air blowing.

Drying of the coating layer may be performed at a temperature ranging from about 70° C. to about 120° C. Within this temperature range, drying of the coating layer may be completed within a suitable time. For example, this temperature range may provide an advantage of forming a relatively smooth coating layer by preventing surface irregularities resulting from rapid drying without requiring a long drying time.

According to an implementation, the coating layer of the separator may contain a coating composition loading amount of about 5 g/m$^2$ to about 10 g/m$^2$, and may have a thickness of about 1 μm to about 15 μm, for example, about 1 μm to about 7 μm. The term "coating composition loading amount" refers to a weight per unit area of the coating layer. Within this thickness range, the coating layer may provide excellent thermal stability and adhesion, and may suppress an increase in internal resistance of the battery by preventing or reducing the likelihood of an excessive increase in the thickness of the separator.

According to an implementation, the ratio of the inorganic particles having an average particle size of about 150 nm to about 600 nm to the inorganic particles having an average particle size of about 5 nm to about 90 nm may range from about 99.9%:0.1% to 70%:30% based on the total amount of the inorganic particles.

According to an implementation, the ratio of the inorganic particles having an average particle size of about 150 nm to about 600 nm to the inorganic particles having an average particle size of about 5 nm to about 90 nm may range from about 99%:1% to about 93%:7% based on the total amount of the inorganic particles.

An optimal ratio of two types of inorganic particles having different average particle sizes may be determined according to the particles sizes of inorganic particles selected. According to embodiments, it can be seen that, when larger inorganic particles have an average particle size of about 500 nm, the weight ratio of smaller inorganic particles in the mixture of the inorganic particles having different average particle sizes may be increased with increasing average particle size of the smaller inorganic particles in order to maximize thermal conductivity.

In one implementation, the inorganic particles of the polyolefin porous separator may be alumina ($Al_2O_3$) particles.

In an implementation, the polyolefin porous base film of the polyolefin porous separator may be selected from the group of a polyethylene monolayer film, a polypropylene monolayer film, a polyethylene/polypropylene bilayer film, a polypropylene/polyethylene/polypropylene triple-layer film, and a polyethylene/polypropylene/polyethylene triple-layer film.

The polyolefin base film may have a thickness of about 1 μm to about 40 μm, for example, about 1 μm to about 25 μm. Within this thickness range of the polyolefin base film, the separator may be formed to a suitable thickness, thereby preventing short circuit of the positive electrode and the negative electrode while improving stability of the battery. If the thickness of the separator exceeds this range, there may be an increase in internal resistance of the battery.

In another implementation, the separator may have a thermal shrinkage of 15% or less. Here, any suitable method may be used without limitation to measure the thermal shrinkage of the separator. For example, the thermal shrinkage of the separator may be measured as follows: a prepared separator may be cut into a size of about 5 cm×about 5 cm and left in a chamber at 150° C. for 1 hour, followed by measuring degrees of shrinkage in the machine direction (MD) and the transverse direction (TD) to calculate thermal shrinkage.

When the porous separator including the coating layer according to embodiments is applied to an electrochemical battery, the coating layer may exhibit an adhesive strength of 10 gf/cm$^2$ or more to electrodes of the battery. Within this range, the coating layer and the electrodes may be sufficiently strongly attached together to suppress thermal shrinkage of the separator, thereby preventing or reducing the likelihood of a short circuit in the positive and negative electrodes. In addition, in the production of high output, large capacity batteries, the separator may improve the stability and lifespan of the batteries.

Here, any suitable method known in the art may be used to measure adhesive strength between the coating layer and the electrodes.

For example, the adhesive strength between the coating layer and the electrodes may be measured as follows: a prepared separator is placed between both electrodes to prepare a battery stack (for example, an electrode assembly) of positive electrode/separator/negative electrode, which in turn may be inserted into an aluminum pouch. Then, with an electrolyte injected into the aluminum pouch, the aluminum pouch is sealed and formed into a single-plate cell, which in turn is subjected to a force of 100 kgf/cm$^2$ for 20 seconds at 50° C. and left for 12 hours. Next, after disassembling each of the single-plate cells, the battery stack of the positive electrode, the separator and the negative electrode bonded to each other is cut into a size of 1.5 cm (MD)×7 cm (TD) and attached to a glass plate using a transparent double-sided tape (3M), followed by measuring adhesive strength between the electrodes and the separator using a tensile strength tester (UTM; Universal Test Machine).

Embodiments may also provide a battery stack, for example, an electrode assembly, including a positive electrode, a negative electrode, and the separator between the positive electrode and the negative electrode.

Embodiments may also provide an electrochemical battery that includes the battery stack including the separator, a positive electrode, a negative electrode, and an electrolyte. FIG. 1 illustrates an electrochemical battery 10 according to an embodiment. The electrochemical battery 10 may include a battery stack made up of a separator including a base film 1, a coating layer 2a and 2b on both sides of the base film 1 (although the coating layer may also be on only one side of the base film), a positive electrode 3, and a negative electrode 4, and an electrolyte 5. The electrochemical battery 10 of FIG. 1 is merely a representation and various elements that may be included in the electrochemical battery 10 (e.g., a case, a cap plate, terminals, etc.) are not illustrated.

In one implementation, the electrochemical battery may be a lithium rechargeable battery. The lithium rechargeable battery may be a lithium metal rechargeable battery, a lithium ion rechargeable battery, a lithium polymer rechargeable battery, a lithium ion polymer rechargeable battery, or the like.

Any suitable method may be used in the manufacture of the electrochemical battery. For example, the electrochemical battery may be manufactured by placing the polyolefin separator including the coating layer of the organic and inorganic mixture between a positive electrode and a negative electrode, and filling a space therebetween with an electrolyte.

The electrodes of the electrochemical battery may be prepared in the form of assemblies of electrode active materials and current collectors, which may be combined by a suitable method.

As the positive active material of the battery, any suitable positive electrode active material may be used. For example, the positive electrode may include a positive electrode active material that allows reversible intercalation and deintercalation of lithium ions. Examples of such positive electrode active materials may include composite metal oxides of lithium and at least one metal selected from cobalt, manganese, and nickel. The amount of lithium dissolved between metal elements may be determined in various ways. In addition to these metals, the positive electrode active material may further include an element selected from the group of Mg, Al, Co, Ni, K, Na, Ca, Si, Ti, Sn, V, Ge, Ga, B, As, Zr, Mn, Cr, Fe, Sr, V, and rare earth metal elements. For example, the positive electrode may be a composite metal oxide of lithium and a metal selected from the group of Co, Ni, Mn, Al, Si, Ti and Fe. Specific examples include lithium cobalt oxide (LCO, for example, LiCoO$_2$), lithium nickel cobalt manganese oxide (NCM, for example, Li[Ni(x)Co(y)Mn(z)]O$_2$), lithium manganese oxide (LMO, for example, LiMn$_2$O$_4$, LiMnO$_2$), lithium iron phosphate (LFP, for example, LiFePO$_4$), lithium nickel oxide (LNO, for example, LiNiO$_2$), or the like.

The negative electrode includes a negative electrode active material that allows reversible intercalation and deintercalation of lithium ions. Examples of such negative electrode active materials include crystalline or amorphous carbon, or carbonaceous negative electrode active materials of carbon composites (thermally decomposed carbon, coke, graphite), combusted organic polymer compounds, carbon fibers, tin oxide compounds, lithium metals, or alloys of lithium and other elements. Examples of amorphous carbon may include hard carbon, coke, mesocarbon microbead (MCMB) baked at 1500° C., mesophase pitch-based carbon fiber (MPCF) baked at 1500° C., or the like. Examples of crystalline carbon may include graphite materials, specifically natural graphite, graphitized coke, graphitized MCMB, graphitized MPCF, or the like. For example, the negative electrode may be a crystalline or amorphous carbon electrode.

The positive electrode or negative electrode may be produced by dispersing an electrode active material, a binder, a conductive material, and, if desired, a thickener, in a solvent to produce an electrode slurry composition, followed by depositing the slurry composition on an electrode current collector. The positive electrode current collector may be made of aluminum, aluminum alloys, or the like. The negative electrode current collector may be made of copper, copper alloys, or the like. The positive electrode current collector and negative electrode current collector may be prepared in the form of a foil or mesh.

As the current collector of the battery, any suitable current collector may be used. Examples of a positive electrode current collector may include aluminum foils, nickel foils, or combination thereof. Examples of a negative electrode current collector may include copper foils, gold foils, nickel foils, copper alloy foils, or a combination thereof.

As the electrolyte of the battery, any suitable electrolyte for electrochemical batteries may be used.

The electrolyte may be obtained through dissolution or dissociation of a salt having, for example, a structure of A$^+$B$^-$ in an organic solvent. Examples of the A$^+$ component, for example, the cation, may include alkali metal cations such as Li$^+$, Na$^+$ or K$^+$, or a combination thereof. Examples of the B$^-$ component, for example, the anion, may include PF$_6^-$, BF$_4^-$, Cl$^-$, Br$^-$, I$^-$, ClO$_4^-$, AsF$_6^-$, CH$_3$CO$_2^-$, CF$_3$SO$_3^-$, N(CF$_3$SO$_2$)$_2^-$, C(CF$_2$SO$_2$)$_3^-$, or combinations thereof.

Examples of the organic solvent may include propylene carbonate (PC), ethylene carbonate (EC), diethylcarbonate (DEC), dimethylcarbonate (DMC), dipropylcarbonate (DPC), dimethylsulfoxide, acetonitrile, dimethoxyethane, diethoxyethane, tetrahydrofuran, N-methyl-2-pyrrolidone (NMP), ethylmethylcarbonate (EMC), and γ-butyrolactone, or the like. These may be used alone or in combination thereof.

The following Examples and Comparative Examples are provided in order to highlight characteristics of one or more embodiments, but it is to be understood that the Examples and Comparative Examples are not to be construed as limiting the scope of the embodiments, nor are the Comparative Examples to be construed as being outside the scope of the embodiments. Further it is to be understood that the embodiments are not limited to the particular details described in the Examples and Comparative Examples.

Example 1 to 8 and Comparative Example 1 to 4

Preparation of Separator Including Coating Layer of Organic and Inorganic Mixture Example 1

(1) Preparation of Coating Agent

1) A polyvinylidene fluoride-hexafluoropropylene (PVdF-HFP) copolymer (21216, Solvay) having a weight average molecular weight of 700,000 g/mol was added in an amount of 10 wt % to acetone (Daejung Chemicals & Metals), followed by stirring at 25° C. for 4 hours using a stirrer to prepare a first polymer solution.

2) A polyvinylidene fluoride (PVdF) homopolymer (5130, Sovay) of a weight average molecular weight of 1,100,000 g/mol was added in an amount of 10 wt % to DMF (Daejung Chemicals & Metals), followed by stirring at 25° C. for 4 hours using a stirrer to prepare a second polymer solution.

3) 24.75% of $Al_2O_3$ (Nippon Light Metal Company Ltd.) having an average particle size of 500 nm and 0.25% of $Al_2O_3$ (Nanoarmo) having an average particle size of 20 nm were added to acetone (Daejung Chemicals & Metals), followed by milling at 25° C. for 3 hours using a bead mill to prepare an inorganic dispersion.

The prepared first polymer solution, second polymer solution and inorganic dispersion were mixed in a ratio of first polymer solution:second polymer solution:inorganic dispersion:solvent (acetone)=1:1:3:6, and stirred at 25° C. for 2 hours using a power mixer to prepare a coating agent.

(2) Preparation of Separator

The prepared coating agent was coated on both sides of a 9 μm thick polyethylene single base film by dip coating and dried at a temperature of 120° C. and a wind speed of 15 m/s for 0.03 hours to prepare a separator.

Example 2

A separator was prepared in the same manner as in Example 1 except that in 3) of Example 1, $Al_2O_3$ (Nippon Light Metal Company Ltd.) having an average particle size of 500 nm was added in a ratio of 24.25% and $Al_2O_3$ (Nanoarmo) having an average particle size of 20 nm was added in a ratio of 0.75%.

Example 3

A separator was prepared in the same manner as in Example 1 except that in 3) of Example 1, $Al_2O_3$ (Nippon Light Metal Company Ltd.) having an average particle size of 500 nm was added in a ratio of 23.75% and $Al_2O_3$ (Nanoarmo) having an average particle size of 20 nm was added in a ratio of 1.25%.

Example 4

A separator was prepared in the same manner as in Example 1 except that in 3) of Example 1, $Al_2O_3$ (Nippon Light Metal Company Ltd.) having an average particle size of 500 nm was added in a ratio of 24.25% and $Al_2O_3$ (Nanoarmo) having an average particle size of 50 nm was added in a ratio of 0.75%.

Example 5

A separator was prepared in the same manner as in Example 1 except that in 3) of Example 1, $Al_2O_3$ (Nippon Light Metal Company Ltd.) having an average particle size of 500 nm was added in a ratio of 23.75% and $Al_2O_3$ (Nanoarmo) having an average particle size of 50 nm was added in a ratio of 1.25%.

Example 6

A separator was prepared in the same manner as in Example 1 except that in 3) of Example 1, $Al_2O_3$ (Nippon Light Metal Company Ltd.) having an average particle size of 500 nm was added in a ratio of 24.25% and $Al_2O_3$ (Nanoarmo) having an average particle size of 70 nm was added in a ratio of 0.75%.

Example 7

A separator was prepared in the same manner as in Example 1 except that in 3) of Example 1, $Al_2O_3$ (Nippon Light Metal Company Ltd.) having an average particle size of 500 nm was added in a ratio of 23.75% and $Al_2O_3$ (Nanoarmo) having an average particle size of 70 nm was added in a ratio of 1.25%.

Example 8

A separator was prepared in the same manner as in Example 1 except that in 3) of Example 1, $Al_2O_3$ (Nippon Light Metal Company Ltd.) having an average particle size of 500 nm was added in a ratio of 23.25% and $Al_2O_3$ (Nanoarmo) having an average particle size of 70 nm was added in a ratio of 1.75%.

Comparative Example 1

A separator was prepared in the same manner as in Example 1 except that in 3) of Example 1, only $Al_2O_3$ (Nippon Light Metal Company Ltd.) having an average particle size of 500 nm was added in a ratio of 25% to acetone (Daejung Chemicals & Metals), instead of using two types of $Al_2O_3$ particles having an average particle size of 500 nm and an average particle size of 20 nm.

Comparative Example 2

A separator was prepared in the same manner as in Example 1 except that in 3) of Example 1, only $Al_2O_3$ (Nanoarmo) having an average particle size of 100 nm was added in a ratio of 25% to acetone (Daejung Chemicals & Metals), instead of using two types of $Al_2O_3$ particles having average particle sizes of 500 nm and 20 nm.

[Measurement of Physical Properties of Separator]

The physical properties of the separators prepared in Examples 1 to 8 and Comparative Examples 1 and 2 were measured by the following methods.

1. Each of the separators was cut into a size of 10 cm (MD)×20 cm (TD) to prepare specimens, the weight of each being measured using an electronic scale, followed by calculating a coating composition loading amount. Calculation results of the coating composition loading amount are given in $g/m^2$.

2. The thickness of the coating layer of each separator was measured using a cross section SEM image and a microcaliper.

3. The density of the coating layer of each separator was obtained by dividing the coating amount obtained in Item 1 by the thickness of the coating layer obtained in Item 2.

4. Each of the separators was cut into a size of 5 cm (MD)×5 cm (TD) to prepare specimens, which in turn were stacked to 40 plies, followed by measurement of thermal conductivity using a TCi instrument (available from C-Therm).

Measurement results of the physical properties of the separators prepared in Examples 1 to 8 and Comparative Examples 1 and 2 are shown in Table 1.

TABLE 1

| Example/Comparative Example | Ratio of first $Al_2O_3$ (Particle size) | Ratio of second $Al_2O_3$ (Particle size) | Coating composition loading amount (g/m$^2$) | Thickness of coating layer (µm) | Density of coating layer (g/cm$^3$) | Thermal conductivity (W/m · K) |
|---|---|---|---|---|---|---|
| Example 1 | 99 ($D_{50}$ = 500 nm) | 1 ($D_{50}$ = 20 nm) | 8.3 | 4.1 | 2.024 | 0.30 |
| Example 2 | 97 ($D_{50}$ = 500 nm) | 3 ($D_{50}$ = 20 nm) | 8.2 | 4.0 | 2.050 | 0.34 |
| Example 3 | 95 ($D_{50}$ = 500 nm) | 5 ($D_{50}$ = 20 nm) | 8.5 | 4.2 | 2.024 | 0.31 |
| Example 4 | 97 ($D_{50}$ = 500 nm) | 3 ($D_{50}$ = 50 nm) | 8.3 | 4.1 | 2.024 | 0.30 |
| Example 5 | 95 ($D_{50}$ = 500 nm) | 5 ($D_{50}$ = 50 nm) | 8.6 | 4.0 | 2.150 | 0.40 |
| Example 6 | 97 ($D_{50}$ = 500 nm) | 3 ($D_{50}$ = 70 nm) | 8.3 | 4.1 | 2.024 | 0.32 |
| Example 7 | 95 ($D_{50}$ = 500 nm) | 5 ($D_{50}$ = 70 nm) | 8.6 | 4.2 | 2.048 | 0.36 |
| Example 8 | 93 ($D_{50}$ = 500 nm) | 7 ($D_{50}$ = 70 nm) | 8.7 | 4.1 | 2.122 | 0.38 |
| Comparative Example 1 | 100 ($D_{50}$ = 500 nm) | 0 | 8.2 | 4.2 | 1.952 | 0.26 |
| Comparative Example 2 | 100 ($D_{50}$ = 100 nm) | 0 | 6.5 | 4.3 | 1.512 | 0.07 |

Comparative Example 3

A separator was prepared in the same manner as in Example 1 except that a composition of the coating agent was prepared by mixing the first polymer solution, the inorganic dispersion and the solvent in a ratio of the first polymer solution:inorganic dispersion:solvent (acetone)=1:1.5:3 without using the second polymer solution in (1) of Example 1.

Comparative Example 4

A separator was prepared in the same manner as in Example 1 except that a PVdF homopolymer having a weight average molecular weight of 500,000 g/mol was used in (1) of Example 1.

Experimental Example 1

Measurement of Thermal Shrinkage of Separator

Each of the separators prepared in Example 1 and Comparative Examples 3 and 4 was cut into a size of 5 cm×5 cm to prepare three specimens. Each of the specimens was left in a chamber at 150° C. for 1 hour, followed by measuring degrees of shrinkage of each specimen in MD and TD directions to calculate thermal shrinkage. Measurement results of thermal shrinkage are shown in Table 2, below.

Experimental Example 2

Measurement of Peel Strength Between Coating Layer and Base Film

Each of the coating layers prepared in Example 1 and Comparative Examples 3 and 4 was cut into 1.5 cm×7 cm pieces to prepare three specimens. Each of the specimens were strongly attached to a glass plate using a transparent double-sided tape (3M), followed by measuring force for separating the coating layer using a tensile strength tester (UTM; Universal Test Machine). Measurement results of peel strength are shown in Table 2.

Experimental Example 3

Measurement of Adhesive Strength Between Coating Layer and Electrode

Each of the separators prepared in Example 1 and Comparative Examples 3 and 4 was placed and bonded between both electrodes of a lithium rechargeable battery to prepare a battery stack of positive electrode/separator/negative electrode, which in turn was inserted into an aluminum pouch.

Then, with an electrolyte injected into the aluminum pouch, the aluminum pouch was sealed and formed into three single-plate cells, which in turn were subjected to a force of 100 kg/cm$^2$ for 20 seconds at 50° C. and left for 12 hours.

Next, after disassembling each of the single-plate cells, the battery stack of the positive electrode, the separator and the negative electrode bonded to each other was cut into a size of 1.5 cm (MD)×7 cm (TD) and attached to a glass plate using a transparent double-sided tape (3M), followed by measuring the adhesive strength between the coating layer and the electrodes of the separator using a tensile strength tester (UTM; Universal Test Machine). Measurement results of adhesive strength are shown in Table 2.

TABLE 2

| Specimen | Thermal shrinkage of separator (%) | Peel strength between coating layer and base film (gf/cm$^2$) | Adhesive strength between coating layer and electrode (gf/cm$^2$) |
|---|---|---|---|
| Example 1 | 15 | 100 | 42 |
| Comparative Example 3 | 20 | 10 | 5 |
| Comparative Example 4 | 28 | 20 | 8 |

As shown above, the separator including a coating layer that is formed on a polyolefin porous separator using different types of inorganic particles having different average particle sizes may have a high loading amount of a coating composition and a high density in the coating layer and may provide excellent thermal conductivity by reducing porosity between the inorganic particles in the coating layer such that the inorganic particles are densely dispersed in the coating layer.

In addition, the coating layer of the separator contains a polyvinylidene fluoride homopolymer having a weight average molecular weight of about 1,000,000 g/mol or more and a polyvinylidene fluoride-hexafluoropropylene copolymer having a weight average molecular weight of about 800,000 g/mol or less in a binder polymer. Accordingly, the coating layer of the separator may provide excellent adhesive strength.

Further, the coating layer of the separator may have excellent adhesive strength and heat dissipation capability, and thus may be strongly adhered to the base film, thereby efficiently suppressing thermal shrinkage of the separator. When such a separator is applied to a battery, a short circuit of electrodes due to overheating of the battery may be prevented or hindered, thereby improving the operating stability and lifespan of the battery.

By way of summation and review, in order to improve the portability of electronic devices such as mobile devices and notebook computers, electrochemical batteries have been developed to have a lighter and thinner structure while ensuring high output and high capacity for use in electric cars and the like. In order to provide high capacity batteries, it is desirable for a separator of a battery to be slim and have a light weight while ensuring high adhesion and shape stability based on high heat resistance.

For example, a separator may include a coating layer formed on one or both sides of a base film by coating single average particle diameter inorganic particles and an organic binder polymer thereon. Such a separator including a coating layer may achieve relatively stable prevention or reduced likelihood of short circuits between electrodes even at high temperatures.

However, in order for a porous active layer coated on the separator to be able to suppress thermal shrinkage of the polyolefin porous base film, it is desirable that the coating layer contain a sufficient amount of the inorganic particles. However, the use of inorganic particles having a single average particle diameter may result in a large porosity between inorganic particles, thereby reducing the loading amount of a coating composition and the coating density in a coating layer as compared with the thickness of the coating layer, and thus making it difficult to achieve sufficient thermal conductivity.

In contrast, embodiments may provide a separator for a battery that includes a coating layer formed on a polyolefin porous separator using different types of inorganic particles having different average particle sizes. Accordingly, a high loading amount of a coating composition and a high density in the coating layer may be obtained, and excellent thermal conductivity may be achieved by reducing the porosity between the inorganic particles in the coating layer.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A porous separator, comprising:
a polyolefin porous base film; and
a coating layer formed on one or both sides of the base film, wherein:
the coating layer includes inorganic particles, the inorganic particles including first inorganic particles having an average particle size ranging from about 150 nm to about 600 nm, and second inorganic particles having an average particle size ranging from about 5 nm to about 90 nm,
the first inorganic particles and the second inorganic particles are mixed in a weight ratio from about 93:7 to about 99.9:0.1, and
the separator has a thermal conductivity of 0.3 W/m·K or more.

2. The porous separator as claimed in claim 1, wherein the coating layer includes:
about 70 wt % to about 90 wt % of the inorganic particles, and
about 10 wt % to about 30 wt % of a binder polymer.

3. The porous separator as claimed in claim 2, wherein the binder polymer includes:
a polyvinylidene fluoride homopolymer, and
a polyvinylidene fluoride-hexafluoropropylene copolymer.

4. The porous separator as claimed in claim 3, wherein:
the polyvinylidene fluoride homopolymer has a weight average molecular weight of about 1,000,000 g/mol or more, and
the polyvinylidene fluoride-hexafluoropropylene copolymer has a weight average molecular weight of about 800,000 g/mol or less.

5. The porous separator as claimed in claim 1, wherein the first inorganic particles and the second inorganic particles are mixed in a weight ratio from about 93:7 to about 99:1.

6. The porous separator as claimed in claim 1, wherein:
an average particle size of the first inorganic particles is about 500 nm,
an average particle size of the second inorganic particles is about 20 nm, and
the first inorganic particles and the second inorganic particles are mixed in a weight ratio from about 95:5 to about 99:1.

7. The porous separator as claimed in claim 1, wherein:
an average particle size of the first inorganic particles is about 500 nm,
an average particle size of the second inorganic particles is about 50 nm, and
the first inorganic particles and the second inorganic particles are mixed in a weight ratio from about 95:5 to about 97:3.

8. The porous separator comprising: a polyolefin porous base film; and a coating layer formed on one or both sides of the base film, wherein: the coating layer includes inorganic particles, an average particle size of the first inorganic particles is about 500 nm, an average particle size of the second inorganic particles is about 70 nm, the first inorganic particles and the second inorganic particles are mixed in a weight ratio from about 91:9 to 97:3 and the separator has a thermal conductivity of 0.3 W/m·K or more.

9. The porous separator as claimed in claim 1, wherein the inorganic particles include alumina ($Al_2O_3$) particles.

10. The porous separator as claimed in claim 1, wherein the polyolefin porous base film is selected from the group of a polyethylene monolayer film, a polypropylene monolayer film, a polyethylene/polypropylene bilayer film, a polypropylene/polyethylene/polypropylene triple-layer film, and a polyethylene/polypropylene/polyethylene triple-layer film.

11. The porous separator as claimed in claim 1, wherein:
the separator has a coating composition loading amount of about 5 g/m² to about 10 g/m², and
the coating layer has a thickness of about 1 μm to about 7 μm.

12. The porous separator as claimed in claim 1, wherein the separator has a thermal shrinkage of 15% or less.

13. A battery stack, comprising:
a positive electrode;
a negative electrode; and
a separator between the positive electrode and the negative electrode,
wherein:
the separator includes a polyolefin porous base film, and a coating layer formed on one or both sides of the base film, the coating layer including inorganic particles, the inorganic particles including first inorganic particles having an average particle size ranging from about 150 nm to about 600 nm, and second inorganic particles having an average particle size ranging from about 5 nm to about 90 nm, the first inorganic particles and the second inorganic particles are mixed in a weight ratio from about 93.7 to about 99.9:0.1, and
the separator has a thermal conductivity of 0.3 W/m·K or more.

14. The battery stack as claimed in claim 13, wherein an adhesive strength between the coating layer and one or both of the positive electrode and the negative electrode is 10 gf/cm² or more.

15. The battery stack as claimed in claim 13, wherein the battery stack is an electrode assembly of a lithium ion rechargeable battery.

16. The battery stack as claimed in claim 13, wherein the positive electrode is selected from the group of lithium cobalt oxide, lithium nickel cobalt manganese oxide, lithium manganese oxide, lithium iron phosphate and lithium nickel oxide electrodes; and the negative electrode is a crystalline or amorphous carbon electrode.

17. An electrochemical battery, comprising:
a positive electrode;
a negative electrode;
a separator between the positive electrode and the negative electrode; and
an electrolyte,
wherein:
the separator includes a polyolefin porous base film, and a coating layer formed on one or both sides of the base film, the coating layer including inorganic particles, the inorganic particles including first inorganic particles having an average particle size ranging from about 150 nm to about 600 nm, and second inorganic particles having an average particle size ranging from about 5 nm to about 90 nm,
the first inorganic particles and the second inorganic particles are mixed in a weight ratio from about 93.7 to about 99.9:0.1, and
the separator has a thermal conductivity of 0.3 W/m·K or more.

18. The electrochemical battery as claimed in claim 17, wherein the positive electrode is selected from the group of lithium cobalt oxide, lithium nickel cobalt manganese oxide, lithium manganese oxide, lithium iron phosphate and lithium nickel oxide electrodes; and the negative electrode is a crystalline or amorphous carbon electrode.

19. The electrochemical battery as claimed in claim 17, wherein the electrochemical battery is a lithium rechargeable battery.

* * * * *